Figure 2:
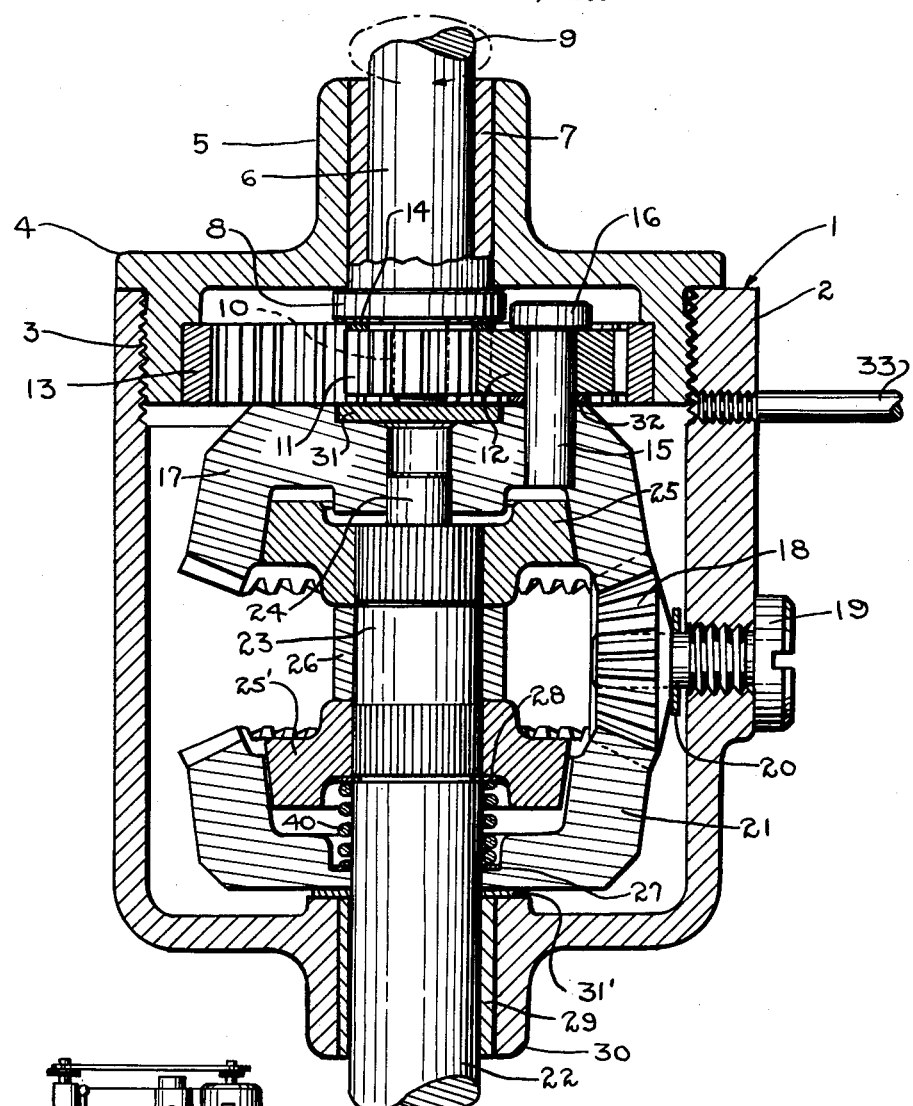

Jan. 29, 1963  H. A. BRISTOL  3,075,398
THREADING ATTACHMENT
Filed Nov. 4, 1959

INVENTOR.
Howard A. Bristol
BY
Atty.

United States Patent Office 3,075,398
Patented Jan. 29, 1963

3,075,398
THREADING ATTACHMENT
Howard A. Bristol, Chicago, Ill., assignor to Supreme Products Corporation, Chicago, Ill., a corporation of Illinois
Filed Nov. 4, 1959, Ser. No. 850,915
4 Claims. (Cl. 74—379)

This invention relates generally to threading attachments for machine tools and more particularly to improvements in reversible threading attachments which may be easily mounted on a standard drill press to perform a threading operation.

Heretofore, it has been necessary to machine, at great expense, precision gears and component parts to insure proper engagement and meshing of the gears for driving and reversing the direction of rotation of a threading tap. Not only was this expensive and involved, but due to close tolerances, an extreme amount of heat was generated. Also, as the precision parts began to wear, the necessarily smooth, straight, axial force required for tapping or threading could not be maintained.

It is therefore the primary object of this invention to provide a simple, durable reversing threading attachment mechanism which will continuously provide a smooth, positive axial force for a threading operation.

A specific object of this invention is to provide a new and useful reversible threading attachment which may be easily mounted on a standard drill press to operate at low speed and high torque with immediate stoppage of rotation in either direction by hand if desired and with a variable effective torque overload release clutch arrangement in both directions.

Another object of this invention is to provide a new and useful threading attachment which has axial movable reversing gears which move relative to the attachment housing to assure perfect alignment of the clutch members and to provide a smooth, positive axial force to the threading tap during threading operations.

A further object of this invention is to provide a reversible threading attachment for drill presses having reduced, equal in and out speeds utilizing a minimum number of gears.

A still further object of this invention is to provide an improved reversible threading attachment of simple construction, virtually free of normally required maintenance, inexpensive to manufacture, and being capable of attachment to any of the known standard drill presses.

Figure 1:
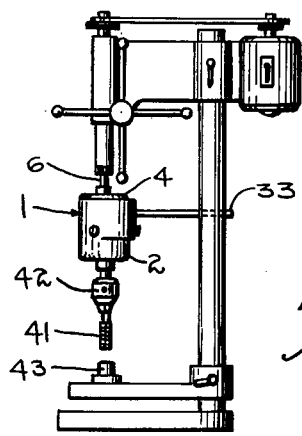

The invention is fully disclosed in the following specification, of which the accompanying drawing forms a part, in which the separate parts of this invention are designated by suitable reference characters in which:

FIG. 1 is a side elevation of a miniaturized drill press as equipped with an embodiment of the invention; and FIG. 2 is an enlarged side elevation, partly in section, of the apparatus in which the present invention is embodied.

Referring to FIG. 1, a reversible threading attachment generally indicated at 1 is shown mounted in driving position under the control of the drill press feed and carrying a chuck 42 supporting a tap 41 for threading a work piece 43. The attachment 1 includes a housing 2 cast or machined from any suitable metal. The housing 2 has a threaded open upper end 3 which has a mating threaded end member 4.

As seen in FIG. 2, the end member 4, being of similar material as housing 2, is machined to provide a centrally located, integral cylindrical portion 5 extending upwardly from its upper surface. The cylindrical portion 5 is provided with a through passage to receive a rotary drive shaft 6 which is concentrically supported therein by a bearing 7. Bearing 7 extends into the internal recessed area of the end member 4 and has an enlarged diameter end portion 8 which seats on the end member 4 and serves as a spacer element for the speed reducing gears which will be described later, and as a partial support for the housing 2 on shaft 6.

The drive shaft 6 has an upper end 9 which is received in a chuck or Morse taper (not shown), and a lower end 10 which extends into the recessed internal area of the end member 4.

A drive gear 11 is rigidly attached to the end 10 of drive shaft 6, and meshes with three follower gears 12, only one of which is shown in the drawing, which in turn meshes and rides in a ring gear 13. The ring gear 13 is secured to the end member 4 by any suitable means such as a pressed fit. Mounted between the drive gear 11 and the enlarged end 8 of bearing 7 is a spacing washer 14.

A shaft 15 passes through the center and is secured to each of the follower gears 12, the upper end thereof having an enlarged diameter 16 to serve as a stop flange, and the lower end thereof passing through and extending into an opening in a gear 17, the opening having a similar diameter to the diameter of the shaft 15 to provide a tight fit.

The gear 17, driven by the three shafts 15, rotates in the same direction as the drive shaft 6 about a driven shaft which will be described later. Three idler gears 18, only one being shown in the drawing, mesh with and are driven by the gear 17. The idler gears 18 are equally spaced 120° apart around the gear 17 and are secured in rotary relationship on the inward end of a threaded stud 19 which extends through and is secured to the housing 2. Each gear 18 is spaced from the housing by a spacer 20.

Meshing with and being driven by the three idler gears 18 is a reverse gear 21, being substantially the same configuration as the opposing, direct drive gear 17, which rotates in a direction opposite to the drive shaft 6 about a driven shaft 22. Gear 21, being substantially the same as gear 17, will rotate at equal speeds but in opposite directions due to the interposition of idler gears 18.

The driven shaft 22 has one end 23 terminating inside of the housing 2. The upper portion of shaft end 23 has a reduced diameter portion 24 about which gear 17 rotates. Rigidly attached to the shaft end 23, by any suitable means are a pair of reversely tapered, cone-shaped clutch members 25 and 25', spaced apart by a spacer 26. The shaft 22 and the clutch members are urged in an upward direction by the force of a compression spring 40. The spring 40 is positioned about shaft 22 between a washer 27 riding on the inner surface of gear 21 and a washer 28 which rides on the lower surface of the clutch member 25'. The shaft 22 extends downwardly through the housing 2, being concentrically positioned thereto by a bearing 29, which is secured by any suitable means, in a cylindrical extended portion 30 of the housing 2, and terminating in any suitable threading tap holding means (not shown).

Positioned between the upper surface of gear 17 and the lower end 10 of drive shaft 6, and between the lower surface of gear 21 and the housing 2 is a pair of spacers 31 and 31'. Similar spacers 32 are positioned between the upper surface of gear 17 and the follower gears 12.

The housing 2 is secured against rotation to any non-movable portion of a drill press by any suitable means and is illustrated in the drawing by a bracket 33 which is threaded into the housing 2. The mounting of the housing must be such as to permit reciprocatory movement of the housing with the drive shaft 6.

In operation, the drive shaft 6 is secured in any suitable chucking device on the driven shaft of the drill press. The housing 2 is secured to a non-moving portion of the drill press, and a desired threading tap 41 is placed in a chuck 42 secured on the lower end of shaft 22.

The drill press drive motor is actuated which causes the drive shaft 6 to be rotated at constant r.p.m. The gear 17 and reverse gear 21 are rotated at a constant speed substantially lower than the speed of the drive shaft 6 due to the speed reducing gears 12.

The driven shaft 22 is rotated in the same direction as the drive shaft 6, due to the frictional engagement of clutch member 25 with the inner surface of gear 17 which is urged into contact by the compression spring 40. The gear 17 is free to move axially on the end 24 of the shaft portion 23 due to a loose mesh with idlers 18, and is limited in this movement by the drive shaft end 10 and a full meshing with idler gears 18. This axial movement of gear 17 assures the smooth engagement and disengagement of the clutch member 25 with gear 17 and permits proper alignment of the driven shaft 22 as mating parts begin to wear.

As the linear actuating mechanism of the drill press is operated to bring the threading tap 41 into contact with a work piece, the axial force increases the frictional contact between the clutch member 25 and the gear 17 sufficiently to produce the required torque for the cutting of threads.

Upon completion of the thread cutting operation, the linear actuating mechanism of the drill press is reversed. Due to engagement of the tap in the work piece, a downward axial force is created in shaft 22 causing the clutch member 25 to back off from mating gear 17 and clutch member 25' to frictionally engage the interior mating surface of gear member 21 while overcoming the bias of spring 40. Gear 21 then drives the shaft 22 and threading tap 41 in the reverse direction enabling the tap to be removed from the work piece as the drill press actuating mechanism is moved upwardly. The gear 21 is free to move axially on the shaft 22 due to a loose mesh with gears 18, similarly to the axial movement of gear 17, to assure a smooth positive engagement and disengagement of the clutch member 25' and to provide proper alignment of mating parts as they begin to wear. The gear 21 is limited in axial movement about shaft 22 by a full meshing with idler gear 18 in one direction and with the housing 2 in the other direction.

The compression spring 40, upon release of the linear actuating mechanism of the drill press, urges the clutch member 25 upwards to engagement with gear 17 to take up lost motion in preparation for the next threading operation.

The idler gear 18 during the thread cutting operation does not carry any of the feed thrust load but only a torque load when backing the tap from the work piece.

From the foregoing description it will be evident to those skilled in the art that this invention provides improvements for a reversible threading attachment for drill presses which are extremely simple in construction, sensitive to the application of pressure thus eliminating threading tap breakage, and utilize non-precision component parts. The invention also provides reversing gear members having limited axial or floating movement within the housing to provide a smooth positive engagement of the clutch members and to assure proper alignment of wearing parts thereby reducing maintenance.

Various obvious, structural changes may be made in the specific embodiment of my invention without departing from the spirit thereof or from the scope of the appended claims.

I claim:

1. A reversible drive coupling for a machine tool to impart a reversible drive between a drive shaft of the tool and a driven output shaft connected to a threading tap to engage a work piece comprising a shiftable housing secured to the tool and receiving therein the spaced adjacent ends of the drive shaft and the driven shaft, speed reducing gear means mounted within the housing, means to interconnect the drive shaft within the housing in drive relationship with the speed reducing gear means, a pair of reversing gears disposed within the housing and mounted respectively on said drive shaft and said driven shaft for relative rotation and axial movement, means to interconnect the speed reducing gear means and the reversing gear means, gear means carried by the housing and interconnecting said reversing gears for rotating the reversing gear on the driven shaft in a direction opposite to the direction of rotation of the reversing gear on the drive shaft, shiftable clutch means within the housing and connected with the driven shaft effective to determine the direction of rotation of the driven shaft in response to axial forces acting on the driven shaft, and a compression spring disposed between said clutch means and one of said reversing gears to normally engage in one direction said clutch means with the other of said reversing gear to effect one direction of rotation of the driven shaft, said one of the reversing gears being slidable axially upon its supporting shaft limited in its axial movement by the housing in one direction and said gear means in the other direction.

2. A reversible drive coupling for a machine tool to impart a reversible drive between a drive shaft of the tool and a driven output shaft connected to a threading tap to engage a work piece, comprising a shiftable housing secured to the tool and receiving therein the spaced adjacent ends of the drive shaft and the driven shaft, speed reducing gear means mounted within the housing, means to interconnect the drive shaft within the housing in drive relationship with the speed reducing gear means, reversing gear means mounted within the housing, said reversing gear means including two axially aligned reversing gears and an idler gear, means to interconnect the speed reducing gears means and the reversing gear means, said interconnecting means and reversing gears being adapted to limited axial motion relative to the housing, said idler gears being carried by the housing and one reversing gear carried by the driven shaft in mesh with the idler gear, said reversing gear being slidable axially upon the driven shaft and being limited by the housing in one direction and said idler gear in the other direction of its axial movement, and shiftable clutch means within the housing and connected with the driven shaft to effectively determine the direction of rotation of the driven shaft in response to axial forces acting on the driven shaft.

3. A reversible drive coupling for a machine tool to impart a reversible drive between a drive shaft of the tool and a driven output shaft connected to a threading tap to engage a work piece, comprising a shiftable housing secured to the tool and receiving therein the spaced adjacent ends of the drive shaft and the driven shaft, speed reducing gear means mounted within the housing, means to interconnect the drive shaft within the housing in drive relationship with the speed reducing gear means, reversing gear means mounted within the housing and carried by said driven output shaft, means to interconnect the speed reducing gear means and the reversing gear means including a reversing gear carried by the speed reducing gear means and an idler carried by the housing and interconnecting the reversing gear and the reversing gear means in drive relationship, said reversing gear means being slidable axially upon the driven output shaft and limited in its axial motion by the housing in one direction and by said idler gear in the opposite direction, shiftable clutch means within the housing and connected with the driven shaft to effectively determine the direction of rotation of the driven shaft in response to axial forces acting on the driven shaft, and bias means disposed between said reversing gear means and said clutch means into contact to normally force in one direction said clutch means with said reversing gear means to effect one normal direction of rotation of the output shaft until sufficient axial force on said driven shaft overcomes the bias means to reversely engage the clutch to cause said driven shaft to be reversely rotated.

4. A reversible drive coupling for a machine tool to impart a reversible drive between a drive shaft of the tool and a driven shaft comprising a shiftable housing secured to the tool, the drive shaft and the driven shaft rotatably received in spaced apart relationship within said housing, a speed reducing gear arrangement disposed within the housing including a ring gear rigidly secured to said housing, a plurality of planet gears equally disposed in mesh with said ring gear and a sun gear rigidly secured to said drive shaft in mesh with said planet gears, a reversing gear arrangement including a first and second reversing gears having opposing inner conical surfaces with beveled teeth adjacent thereto for engagement with a plurality of beveled idler gears equally spaced about the inside of the housing on axes perpendicularly to the axis of said first and second reversing gear, a pin member securing each of said planet gears to the first reversing gear, spacer members disposed between said first reversing gear and said drive shaft and between said first reversing gear and said planet gears, said first reversing gear and said planet gears being free for axial movement relative to the housing limited by the end of said drive shaft in one direction and full mesh with the idler gears in the other direction, said second reversing gear being slidable axially upon said driven shaft limited by the housing in one direction and the idler gears in the other direction, a clutch arrangement disposed within the housing between said first and second reversing gears including a first and second cone shaped clutch members secured to the end of the driven shaft and held in spaced apart relationship by a sleeve member, said cone shaped members alternately engaging the inner cone of said reversing gears to effect reverse rotation of said driven shaft and a spring member disposed between said second reversing gear and said second cone shaped member to maintain said first cone shaped member into friction contact with said first reversing gear to impart rotation in one direction to said driver shaft until an axial force in the driven shaft is reversed sufficiently to overcome the force of said spring member permitting said second cone shape member to engage said second reversing gear to impart a reverse rotation to said driven shaft.

References Cited in the file of this patent
UNITED STATES PATENTS

| | | |
|---|---|---|
| 864,243 | Hovey | Aug. 27, 1907 |
| 1,475,982 | Buhr | Dec. 4, 1923 |
| 1,602,504 | Readey | Oct. 12, 1926 |
| 2,566,211 | Keesling | Aug. 28, 1951 |
| 2,778,238 | Emrick | Jan. 22, 1957 |
| 2,780,944 | Ondeck | Feb. 12, 1957 |